Oct. 26, 1926. H. H. BARBER Re. 16,448
LOADER
Filed Jan. 6 1921 2 Sheets-Sheet 1
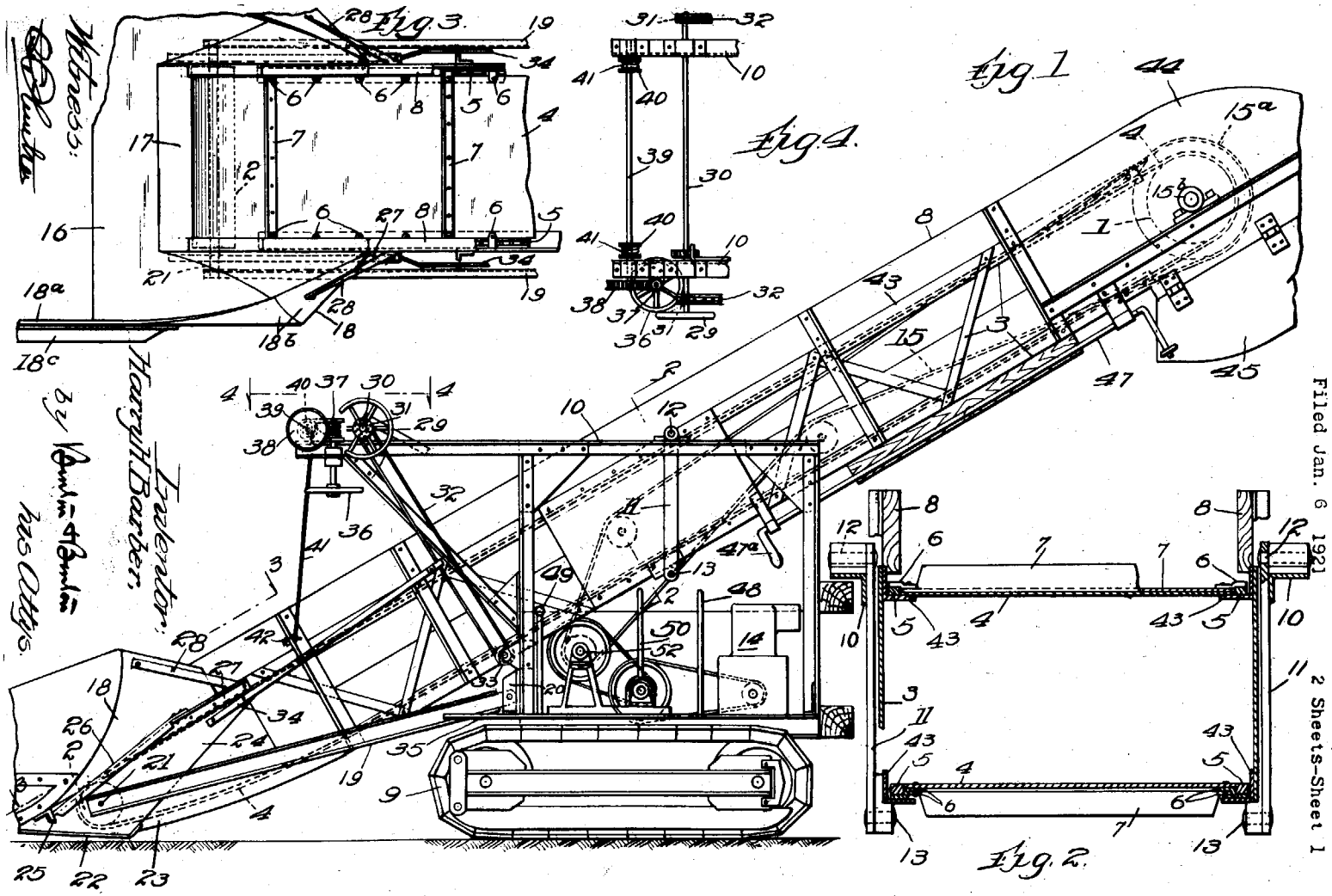

Oct. 26, 1926. H. H. BARBER Re. 16,448
LOADER
Filed Jan. 6 1921 2 Sheets-Sheet 2
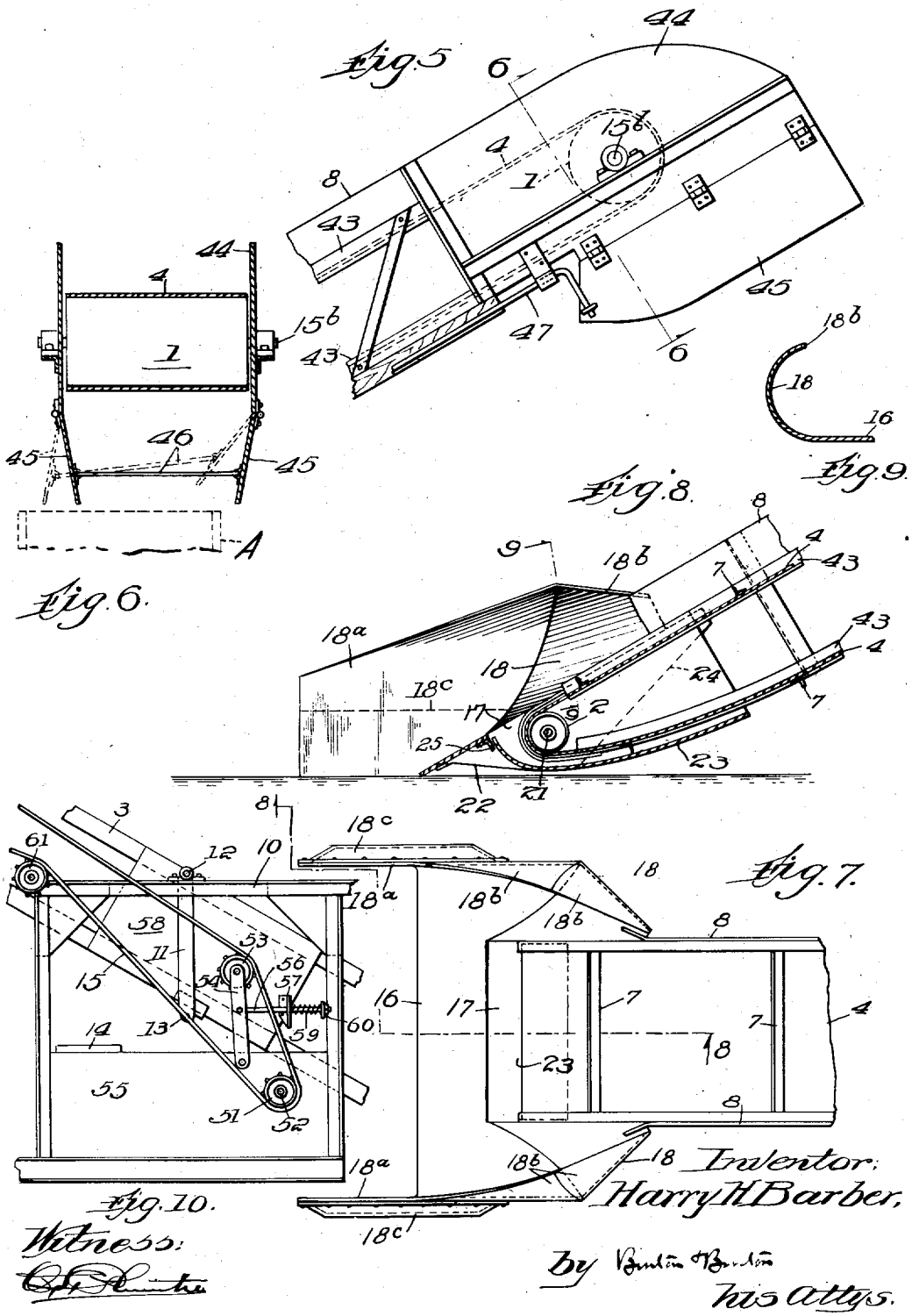

Reissued Oct. 26, 1926.

Re. 16,448

UNITED STATES PATENT OFFICE.

HARRY H. BARBER, OF AURORA, ILLINOIS, ASSIGNOR TO BARBER-GREENE COMPANY, OF AURORA, ILLINOIS, A CORPORATION OF ILLINOIS.

LOADER.

Original No. 1,498,987, dated June 24, 1924, Serial No. 435,480, filed January 6, 1921. Application for reissue filed June 21, 1926. Serial No. 117,575.

This invention relates to a power-driven loader of the endless belt type and its purpose is to provide a machine of this character especially adapted to handle snow for expeditiously cleaning city streets. It consists of the features and elements hereinafter described and shown in the drawings as indicated by the claims.

In the drawings:—

Figure 1 is a side elevation of a loader embodying this invention.

Figure 2 is a transverse section taken through the conveyor and its frame as indicated at line 2—2, on Figure 1, but not including the vehicle frame.

Figure 3 is a detail plan view of the receiving end of the loader with a specially designed scoop or plow associated therewith, the view being taken as indicated at line, 3—3, on Figure 1.

Figure 4 is a detail plan view of certain adjusting devices being taken as indicated at line, 4—4, on Figure 1.

Figure 5 is a side elevation of the upper and discharge end of the conveyor showing the adjustable wing for directing discharge.

Figure 6 is a transverse section taken as indicated at the line, 6—6, on Figure 5.

Figure 7 is a horizontal plan view of the lower end of the conveyor showing the receiving scoop associated therewith.

Figure 8 is a medial section of the parts of the conveyor and of the scoop, shown in Figure 7, being indicated at line, 8—8, on Figure 7.

Figure 9 is a detail section taken as indicated at line, 9—9, on Figure 8 to show the contour of the scoop.

Figure 10 is a partial side elevation showing a take-up for the drive chain.

The endless belt which constitutes the conveyor element of this loader is carried upon an upper drum, 1, and lower drum, 2, journaled in opposite ends of the inclined frame, 3, which may be fabricated in a well understood manner from suitable members such as plates and angles forming lateral trusses and the necessary cross connections between them to provide a fairly rigid mounting for the belt and its carrying drums. The load supporting portions, 4, of the belt may consist of any suitable fabric or rubber, or combination of the two such as is commonly used for this purpose and this belting, 4, is attached at its lateral margins to steel chains, 5, which travel over suitable sprocket wheels associated with the drums, 1 and 2, at their ends. This is of particular importance when the conveyor is used for handling snow or sleet because the accumulation of even a small amount of snow or ice upon the drums, 1 and 2, would result in wasteful slippage of the belt thereon if friction were depended upon for the drive. The belt, 4, is attached to the chains, 5, by suitable clips, 6, disposed at intervals along the chains and also by means of flights, 7, of angular cross-section which are attached at their ends to the chains, 5, by means of the same type of clips, 6, and to which the belt is riveted or bolted at intervals in its width as indicated in Figure 3. The flights of course serve to retain the load of snow or other material picked up by the belt as it is carried upward along the incline to the discharge end where the belt passes over the pulley or drum, 1. The load is also retained and confined upon the belt by means of side boards, 8, supported on the frame, 3, and preferably overhanging the chains, 5, as shown in Figure 2.

The frame 3 is mounted and carried upon any suitable vehicle which, however, is preferably of the crawler tractor type indicated at 9, in Figure 1 and surmounted by a rectangular frame from whose upper horizontal beams, 10, the conveyor frame is suspended by links, 11, pivoted to the beams by trunnions, 12, and to the frame, 3, by trunnions, 13. Any suitable motor, which may be an internal combustion engine such as that indicated at 14, is carried on the vehicle and connected by reduction gearing to the drive belt or chain, 15, running upon the drive sprocket, $15^a$, which is fixed on one end of the shaft, $15^b$, of the drum or pulley, 1.

At the lower or receiving end the conveyor frame is provided with a duplex plow and scoop the bottom of which is formed by a transversely extending blade, 16, whose lower edge is positioned to travel close to the ground for picking up snow or other material therefrom and whose surface may be inclined upward toward the load-carrying ply of the conveyor belt, 4, but stops short of it by some little distance leaving a space, 17, as shown in Figure 3, into which some of the material picked up by the blade, 16, will fall to await the passage of the flights, 7, on the belt, 4. The space, 17, is of substantially the same width as the belt, 4, but the bottom blade, 16, is considerably wider and its laterally extending portions continue upwardly past the space, 17, and alongside the belt, 4, in warped wings, 18, which converge toward the belt so as to direct material thereon as it is forced up along said wings by further accumulations of material gathered upon the blade, 16, as the vehicle, 9, advances.

The wings, 18, are supplemented in their gathering action by blades, 18[a], extending upward from the lateral margins of the bottom blade, 16, and also projecting forward from the ends of its lower edge so as to plow their way into a pile of snow or other material as the vehicle advances, and thus to define the width of the clearing to be made by the machine. The upper edges of the wings, 18, and the supplemental wings or plow-shares, 18[a], are bent over at 18[b], curving inwardly toward each other, somewhat in the manner of a plow mold board so that when the material piles high in the scoop, it will be thrown over toward the middle of the scoop and onto the belt instead of spilling over the upper edges of the wings. For city street cleaning during or after a snow-storm, snow will frequently be moved from the middle of the street toward the curbs by other plows and then picked up by a loading machine of this type and discharged into motor trucks for hauling away; to protect the supplemental wings, 18[a], as they work beside the curbs they may be reinforced by spaced parallel walls, 18[c], extending from the ground to a limited height beside the wings, 18[a], and secured thereto at the margins as seen in Figure 7.

As the crawler, 9, travels forward, its progress is resisted by the material encountered by the scoop and the driving force for moving the scoop into the material is transmitted directly from the crawler, 9, to the conveyor frame, 3, by a pair of thrust beams, 19, pivoted at their rear ends to brackets, 20, on the frame which surmounts the crawler, 9, and with their forward ends pivotally attached to the axle, 21, of the drum, 2. To assist the blade, 16, of the scoop in riding the road surface, it is reenforced at its laterally extending portions beyond the opening, 17, by approximately horizontal plates, 22, forming shoes extending rearwardly from the edge of the blade, as seen in Figures 1 and 8. Between the shoes, 22, and below the opening, 17, a curved plate, 23, forms a boot to retain the material temporarily lodged in the opening, 17. Side plates, 24, suitably flanged and connected to the shoes, 22, serve to stiffen and support them. The blade, 16, itself to re-enforced by a transversely positioned angle member, 25, secured to its under surface and also by oblique braces, 26, connecting the ends of the angle, 25, with members, 27, attached to the upper edges of the plates, 24. The wings, 18, may also be braced if desired by obliquely extending arms, 28, connected to the members, 27.

The entire scoop consisting of the blade, 16, plow wings, 18 and 18[a], and the shoes, 22, with their side plates, 24, is pivotally mounted on the ends of the axle, 21, of the drum, 2. This permits adjusting the scoop up and down through a limited range to accommodate it to the road's surface or prevent it from being snagged upon any small obstruction therein without altering the angle of the main conveyor frame, 3. Such adjustment is effected by a hand wheel, 29, on a shaft, 30, journaled on the extending ends of the frame members, 10, the shaft-carrying sprocket wheels, 31, for endless chains, 32, guided upon idler wheels, 33, and connected with the rearwardly extending arms, 34, which are attached rigidly to the side plates, 24, of the scoop assembly. The operator standing on the platform, 35, at the side of the vehicle frame is thus able to suddenly lift the blade and the scoop above its normal working position and to quickly re-adjust it as close to the road surface as his judgment dictates, For moving the machine about when not in use, or for getting it into a convenient shelter, the conveyor frame, 3, may be swung to a more nearly horizontal position by means of the hand wheel, 36, operating the worm, 37, and gears, 38, on the shaft, 39, whose drums, 40, are thus turned to wind the cables, 41, which are attached to the conveyor frame near its lower end as indicated at 42. Notwithstanding the fixed length of the thrust beams, 19, such movement is permitted by virtue of the suspension of the conveyor frame on the links, 11, which can swing about their trunnions, 12, to accommodate the altered position of the lower end of the conveyor frame.

The use of a flexible material such as a fabric, rubber or combination of the two for the belt, 4, renders it sufficiently flexible to travel over a relatively small guide at the lower end, such as the drum, 2, so that the inclined portion, 16, of the scoop need not be excessively extended and the material gathered by it will be picked up by the belt without the necessity of forcing it up the incline any great distance. The use of the lateral chains, 5, as an integral part of the belt affords a means of driving it without danger of slippage, and when the loader is employed for handling snow, these chains may travel directly in the angles, 43, which form the longitudinal members of the conveyor frame, as indicated in Figure 2, the snow and ice acting as an adequate lubricant between the chains and the angle members to prevent excessive wear. Obviously if the material handled were not of this nature the chains could be provided with idler wheels to support them in the conveyor frame.

As the snow or other material is discharged over the upper pulley or drum, 1, it will fall directly into the receptacle provided, which will ordinarily be the body of a motor truck or wagon. Since it is not always easy to back a truck or wagon under the end of the conveyor in a perfectly central position, the guard plates, 44, at this end are provided with hinged depending wings, 45, preferably connected by a link, 46, so as to converge downward and normally hanging as shown in section in Figure 6, but operable by means of a rock shaft, 47, to discharge the material at either side of the central position, as indicated in dotted lines in said Figure 6, in which the truck body is also shown in dotted lines at A. The depending wings, 45, also serve to control the discharge of material in windy weather, both by shielding it from the wind and by deflecting it if necessary to counteract the effect of the wind striking it below said wings.

The machine is designed to be operated and controlled by one man under ordinary circumstances, though the loading of the material into the scoop may be assisted to some extent by one or two shovelers. The crawler vehicle is controlled in its movements by two levers, one of which, indicated at 48, operates the forward driving clutch when moved in one direction, or connects the reverse drive when shifted to its other limit. The lever, 49, is arranged to selectively control brake bands for retarding or arresting one or the other of the two crawlers so that by virtue of a differential gearing connecting them, the one which is not held will assume the drive and the vehicle will travel in a curve. All necessary steering can be accomplished in this way as is well understood. A third lever, 50, may be understood as operating any suitable form of cutch for connecting or disconnecting the belt conveyor from the engine, 14. Thus the vehicle and the conveyor may be driven simultaneously or independently at will. The handle, 47[a], of the rock shaft, 47, extends within reach of the operator as he stands upon the platform, 35, and the adjusting wheels, 29 and 36, are simultaneously accessible to him while he is operating the vehicle.

By reason of the floating suspension of the conveyor and frame, 3, from the beams, 10, of the vehicle frame, it is necessary to provide an automatic take-up device for the drive chain, 15, to prevent it from becoming too loose when the lower end of the conveyor frame is adjusted vertically or permitted to ride up and down over irregularities of the road surface. As previously noted, the up-and-down movement of the lower end of said frame, 3 is under control of the radius arms or thrust bars, 19, and results in a longitudinal movement of the frame, causing the links, 11, to swing about their trunnions, 12. Since the drive chain, 15, connects the wheel, 15[a], at the upper end of the frame, 3, with a drive sprocket, 51, on the counter shaft, 52, fixedly journaled on the vehicle, the distance between these two centers will be altered by adjustment of the lower end of the frame, 3. A take-up-wheel, 53, is therefore journaled at the end of a swinging arm, 54, fulcrumed at its lower end on a plate, 55, of the vehicle frame. A link, 56, is pivotally attached at one end to the arm, 54, at a point intermediate its fulcrum and the wheel, 53, which it carries, and said link is connected for control to the conveyor frame, 3, by means of a bracket, 57, attached to the plate, 58, of said frame,—a cushion spring, 59, being inserted between the bracket, 57, and the adjusting nut, 60, on the end of said link. The arm, 54, being connected to the frame, 3, by the link, 56, is swung about its fulcrum as the frame floats backwards or forwards upon its supporting links, 11, and thus acts as a lever to multiply the longitudinal movement of the frame, 3, so as to add or subtract the requisite amount from the effective length of both plies of the chain, 15, and keep it sufficiently tight for safe operation. The driving ply of the chain, 15, is further supported upon a fixed idler, 61, journaled on the beam, 10, so as to prevent it from encountering the upper edge of a truck body when the latter is backed under the discharge end of the conveyor.

I claim:—

1. The combination of a vehicle and an endless belt conveyor carried thereon extending from a point near the ground ahead of the vehicle to an elevated discharge point rearward of the vehicle frame with a frame supporting said conveyor belt formed to overhang a clearance space at the rear of the vehicle high enough to admit a wagon or truck to receive the discharge from the conveyor, a pair of depending lateral wings attached to the conveyor frame and between which the material falls when discharged from the conveyor; and means for inclining said wings at will to direct the discharge.

2. In the combination defined in claim 1, a pair of depending lateral wings hinged to the conveyor frame adjacent the point of discharge and means connecting said wings for simultaneously inclining them toward either side of the path of the vehicle to direct the discharge.

3. The combination of a vehicle frame with a load-gathering fixture carried at the forward end and a frame for an endless belt conveyor extending fore and aft of the vehicle and suspended thereon by hangers adapted to swing fore and aft of the vehicle together with a strut projecting forwardly from the vehicle frame for engagement with the forward end of the conveyor frame for transmitting the pushing force of the vehicle directly thereto.

4. In the combination defined in claim 3, said load gathering fixture being supported on the forward end of the conveyor frame.

5. In the combination defined in claim 3, said strut being pivotally attached to the vehicle frame and to the conveyor frame and means for vertically adjusting said conveyor frame up on its hangers.

6. In combination a vehicle and an endless belt conveyor mounted in an inclined position thereon, said conveyor including a frame; means by which the forward end of the conveyor frame is adjustably supported upon the vehicle and a fulcrum for said conveyor frame rearward of said adjustable support and movable fore and aft with respect to the vehicle frame together with a thrust bar pivotally attached at one end to the lower part of the vehicle frame and pivotally connected at the other end to the forward end of the conveyor frame.

7. In the combination defined in claim 6, a power plant on the vehicle with a drive wheel connected thereto, a driven wheel associated with the conveyor belt at one end of the conveyor frame and a drive chain connecting said wheel with the drive wheel on the vehicle together with an idler for said chain mounted for movement fore and aft on the vehicle frame and means connecting its mounting with the conveyor frame to effect such fore and aft movement as the fulcrum of the conveyor frame shifts upon the vehicle.

8. In the combination defined in claim 6, a power plant on the vehicle with a drive wheel connected thereto, a driven wheel associated with the conveyor belt at the upper end of the conveyor frame and a drive chain connecting said wheel with the drive wheel on the vehicle together with a take-up idler for said chain mounted on a swinging arm fulcrumed on the vehicle with a link connecting the conveyor frame with said arm for shifting the take-up wheel in proportion to the longitudinal movement of the conveyor frame upon its supporting links.

9. In the combination of a vehicle with a pair of plows carried at the forward end, spaced apart and formed to deflect material toward each other into the path of advance of the vehicle, and an endless conveyor mounted on the vehicle in an inclined position with its lower end arranged to pick up said material from between the plows, said plows being rigidly connected together by a transversely extending bottom plate to form a scoop adjacent the lower end of the conveyor, said bottom plate being spaced away from the lower end of the conveyor to form a receiving boot and a bottom plate for said boot supported on the conveyor frame independently of the bottom of the scoop.

10. In combination a vehicle with a load-gathering fixture carried at the forward end and an endless belt conveyor mounted on the vehicle in position to receive said material and transfer it rearwardly for discharge, the conveyor belt comprising a width of belting of flexible material with marginal drive chains secured thereto, a frame-supporting said conveyor belt including upper and lower longitudinal rails at each side, said rails being of angular cross-section, each having a flange extending vertically and a flange extending transversely thereof with the vertical flanges spaced apart to receive the conveyor belt between them and the horizontal flanges extending inwardly to support the chains of said belt in their travel.

11. In the combination defined in claim 10, side boards on the conveyor frame extending vertically at the margins of the belt to retain material thereon and disposed directly above said marginal chains overhanging them.

12. In combination, a vehicle and an endless belt conveyor mounted in an inclined position thereon, said conveyor including a frame; means by which the conveyor frame is supported upon the vehicle frame comprising a fulcrum movable fore and aft with respect to the vehicle frame and means for adjusting the conveyor frame about said fulcrum, together with a thrust bar pivotally attached at one end to the lower part of the vehicle frame and pivotally connected at the other end to the forward end of the conveyor frame.

In testimony whereof I have hereunto set my hand at Aurora, Illinois, this 17th day of June, 1926.

HARRY H. BARBER.